US008833065B2

(12) United States Patent
Kawasaki et al.

(10) Patent No.: US 8,833,065 B2
(45) Date of Patent: Sep. 16, 2014

(54) CONTROL DEVICE FOR HYBRID CONSTRUCTION MACHINE

(75) Inventors: Haruhiko Kawasaki, Atsugi (JP); Masahiro Egawa, Kawaguchi (JP)

(73) Assignee: Kayaba Industry Co., Ltd., Tokyo (JP)

( * ) Notice: Subject to any disclaimer, the term of this patent is extended or adjusted under 35 U.S.C. 154(b) by 738 days.

(21) Appl. No.: 13/143,852

(22) PCT Filed: Jul. 2, 2010

(86) PCT No.: PCT/JP2010/061648

§ 371 (c)(1), (2), (4) Date: Jul. 8, 2011

(87) PCT Pub. No.: WO2011/004879

PCT Pub. Date: Jan. 13, 2011

(65) Prior Publication Data

US 2011/0265467 A1 Nov. 3, 2011

(30) Foreign Application Priority Data

Jul. 10, 2009 (JP) ................................. 2009-164280

(51) Int. Cl.

| | |
|---|---|
| ***F16D 31/02*** | (2006.01) |
| ***E02F 9/22*** | (2006.01) |
| ***F15B 21/14*** | (2006.01) |
| ***E02F 9/20*** | (2006.01) |

(52) U.S. Cl.

CPC ..... *E02F 9/2235* (2013.01); *F15B 2211/30555* (2013.01); *F15B 2211/20546* (2013.01); *F15B 2211/88* (2013.01); *E02F 9/2296* (2013.01); *F15B 2211/20515* (2013.01); *F15B 21/14* (2013.01); *E02F 9/2075* (2013.01); *F15B 2211/265* (2013.01); *F15B 2211/20523* (2013.01); *F15B 2211/20576* (2013.01); *E02F 9/2292* (2013.01)

USPC .................. 60/414; 60/419; 60/420; 60/445; 60/450; 60/452; 91/461

(58) Field of Classification Search

USPC ........... 60/414, 419, 420, 422, 445, 450, 452; 91/461

See application file for complete search history.

(56) References Cited

U.S. PATENT DOCUMENTS

| | | | | |
|---|---|---|---|---|
| 2011/0072810 | A1* | 3/2011 | Kawasaki et al. | 60/429 |
| 2011/0268588 | A1* | 11/2011 | Kawasaki et al. | 417/213 |
| 2011/0270498 | A1* | 11/2011 | Kawasaki et al. | 701/50 |

FOREIGN PATENT DOCUMENTS

| | | | |
|---|---|---|---|
| JP | 2004-197825 | A | 7/2004 |
| JP | 2006-064071 | A | 3/2006 |
| JP | 2006-336849 | A | 12/2006 |
| JP | 2007-010006 | A | 1/2007 |
| JP | 2007-327527 | A | 12/2007 |
| WO | WO-2009145054 | A1 | 12/2009 |

* cited by examiner

*Primary Examiner* — Michael Leslie
(74) *Attorney, Agent, or Firm* — Rabin & Berdo, P.C.

(57) ABSTRACT

A control device for a hybrid construction machine includes a discharge pressure introduction passage that leads a discharge pressure from a variable volume pump to a regulator, and a load pressure introduction passage that leads one of a maximum load pressure of respective actuators and a load pressure of a hydraulic motor to the regulator. A controller, having determined that the actuators are in an inoperative condition on the basis of a detection result from an operating condition detector, excites a solenoid of a solenoid pilot control valve such that a discharge oil from the variable volume pump is led to the hydraulic motor, and controls the regulator such that a differential pressure between the discharge pressure of the variable volume pump and the load pressure of the hydraulic motor is kept constant.

6 Claims, 4 Drawing Sheets

CONTROL DEVICE FOR HYBRID CONSTRUCTION MACHINE

TECHNICAL FIELD

This invention relates to a control device for a hybrid construction machine that uses an electric motor as a drive source.

BACKGROUND ART

In a known conventional control device including a load sensing circuit, a maximum load pressure of a plurality of actuators connected to a circuit system is selected, whereupon a regulator controls a discharge flow of a main pump such that a differential pressure between the selected maximum load pressure and a discharge pressure of the main pump remains constant. Further, an operation valve and a pressure compensation valve are connected to each actuator, and control is performed such that a supply flow remains constant regardless of variation in the load pressure of the actuators (see JP2004-197825A).

SUMMARY OF THE INVENTION

In the conventional device described above, an engine rotates constantly, even when the respective actuators are in an inoperative condition. Therefore, when the actuators are inoperative, the engine consumes energy despite doing substantially no work. As a result, great energy loss occurs.

This invention has been designed in consideration of the problem described above, and an object thereof is to provide a control device for a hybrid construction machine with which an improvement in energy efficiency can be achieved by making effective use of a prime mover when an actuator is in an inoperative condition.

This invention is a control device for a hybrid construction machine. The control device for a hybrid construction machine comprises a variable volume pump rotated by a driving force from a prime mover; a regulator that controls a tilt angle of the variable volume pump; a plurality of operation valves that control a flow of a working oil led to respective actuators from the variable volume pump; an operating condition detector that detects an operating condition of the operation valves; a regenerative hydraulic motor rotated by a discharge oil from the variable volume pump; a power generator connected to the hydraulic motor; a flow control valve provided in a flow passage connecting the variable volume pump to the hydraulic motor, an opening of which is controlled by an action of a pilot pressure led to a pilot chamber thereof; a solenoid pilot control valve for controlling the pilot pressure that acts on the pilot chamber of the flow control valve; a discharge pressure introduction passage that leads a discharge pressure of the variable volume pump to the regulator; a load pressure introduction passage that leads one of a maximum load pressure of the respective actuators and a load pressure of the hydraulic motor to the regulator; and a controller which, having determined that the actuators are in an operative condition on the basis of a detection result from the operating condition detector, controls the regulator such that a differential pressure between the discharge pressure of the variable volume pump and the maximum load pressure of the respective actuators is kept constant, and having determined that the actuators are in an inoperative condition, excites a solenoid of the solenoid pilot control valve such that the discharge oil from the variable volume pump is led to the hydraulic motor and controls the regulator such that a differential pressure between the discharge pressure of the variable volume pump and the load pressure of the hydraulic motor is kept constant.

According to this invention, when the actuator is in the inoperative condition, power generation is performed by the hydraulic motor using the driving force of the prime mover, and therefore energy loss can be suppressed.

EMBODIMENTS OF THE INVENTION

A control device for a hybrid construction machine according to an embodiment of this invention will be described below with reference to the figures. In the following embodiment, a case in which the hybrid construction machine is a power shovel will be described.

Figure 1:
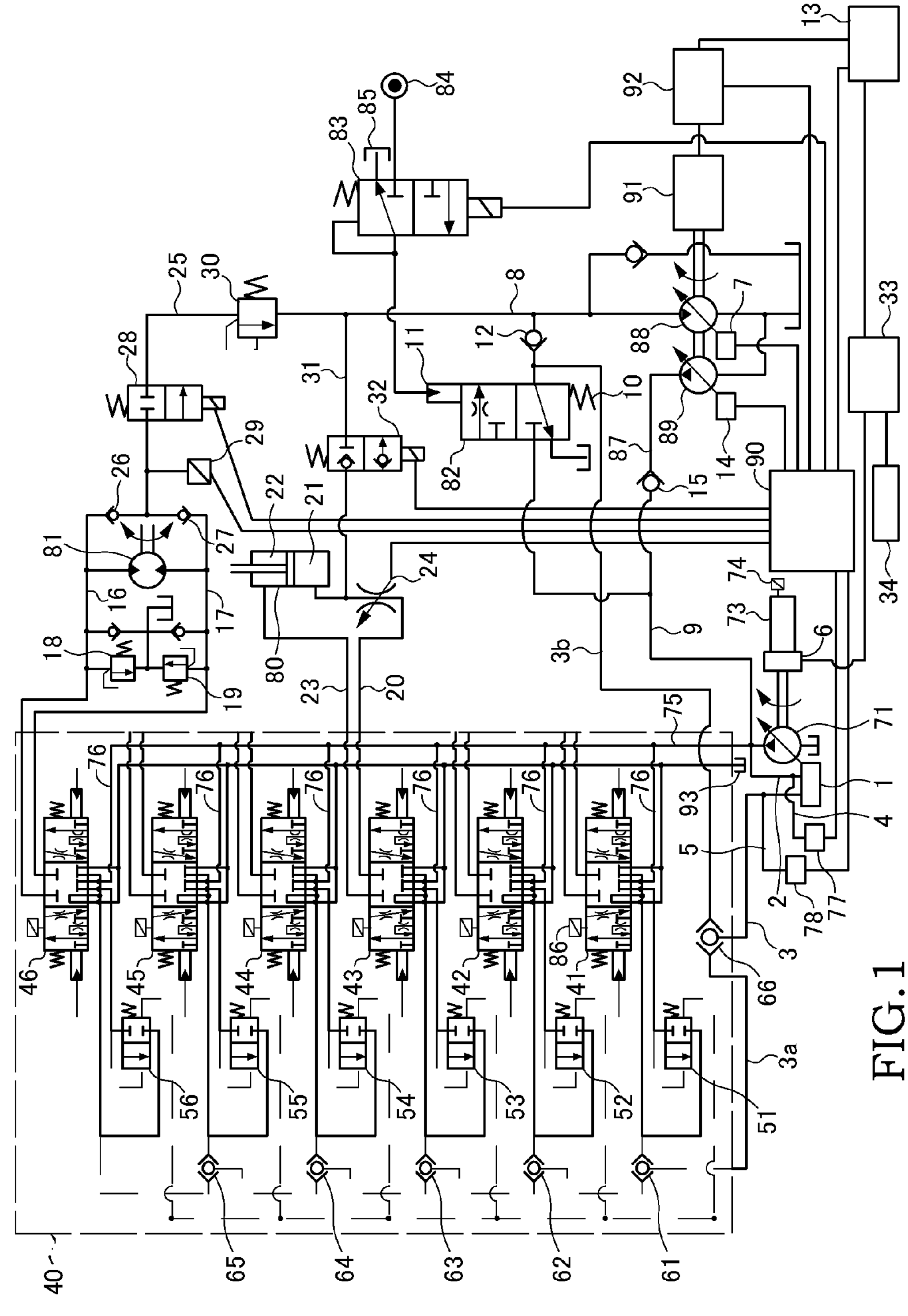
FIG. 1 is a circuit diagram showing a control device for a hybrid construction machine according to an embodiment of this invention.

As shown in FIG. 1, the power shovel is provided with a variable volume type main pump 71 that rotates using a driving force of an engine 73 serving as a prime mover. The engine 73 is provided with a generator 6 that exhibits a power generation function using a surplus force of the engine 73. The engine 73 is also provided with a rotation speed sensor 74 serving as a rotation speed detector that detects a rotation speed of the engine 73. A main flow passage 75 through which a discharged working oil passes is connected to the main pump 71.

The power shovel includes a load sensing circuit 40. The load sensing circuit 40 is provided with operation valves 41, 42 that control a travel motor, an operation valve 43 that controls a boom cylinder 80, an operation valve 44 that controls an arm cylinder, an operation valve 45 that controls a bucket cylinder, and an operation valve 46 that controls a turning motor 81. The respective operation valves 41 to 46 control operations of respective actuators by controlling a flow of discharged oil led to the respective actuators from the main pump 71. The respective operation valves 41 to 46 are connected in parallel via a parallel flow passage 76 that bifurcates from the main flow passage 75. Pressure compensation valves 51 to 56 that perform control such that a constant flow is supplied to the respective actuators regardless of variation in a load pressure of each actuator are connected respectively to the operation valves 41 to 46.

The main pump 71 is provided with a regulator 1 that controls a tilt angle thereof. A discharge pressure introduction passage 2 that leads a discharge pressure of the main pump 71 to the regulator 1 is connected to the main flow passage 75. The load sensing circuit 40 is provided with high pressure selection valves 61 to 65. The high pressure selection valves 61 to 65 select a maximum load pressure from the respective load pressures of the actuators connected to the operation valves 41 to 46, whereupon the maximum load pressure is led to a first pressure leading passage 3*a*. The first pressure leading passage 3*a* is connected, via a high pressure selection valve 66, to a second pressure leading passage 3*b* through which a load pressure of a regenerative hydraulic motor 88, to be described below, passes. The high pressure selection valve 66 selects the higher pressure from the maximum load pressure of the actuators selected by the high pressure selection valves 61 to 65 and the load pressure of the regenerative hydraulic motor 88, whereupon the selected pressure is led to the regulator 1 through a load pressure introduction passage 3. Hence, the pressure led to the regulator 1 through the load pressure introduction passage 3 is either the maximum load pressure of the actuators or the load pressure of the hydraulic motor 88.

The pressure in the discharge pressure introduction passage 2 is detected by a pressure sensor 77 serving as a pressure detector via a first pilot flow passage 4, and a detection result is output to a controller 90. Further, the pressure in the load pressure introduction passage 3 is detected by a pressure sensor 78 serving as a pressure detector via a second pilot flow passage 5, and a detection result is output to the controller 90. The controller 90 calculates a differential pressure between the pressure detected by the pressure sensor 77 and the pressure detected by the pressure sensor 78, and controls the regulator 1 such that the differential pressure remains constant. In other words, the regulator 1 controls the tilt angle of the main pump 71 such that the differential pressure between the discharge pressure of the main pump 71 led through the discharge pressure introduction passage 2 and either the maximum load pressure of the actuators or the load pressure of the hydraulic motor 88 led through the load pressure introduction passage 3 remains constant.

The regenerative hydraulic motor 88 rotates in conjunction with a power generator 91. The hydraulic motor 88 is a variable volume motor, a tilt angle of which is controlled by a regulator 7 connected to the controller 90. A power generated by the power generator 91 is charged to a battery 13 via an inverter 92. The battery 13 is connected to the controller 90 so that the controller 90 can check an amount of charge of the battery 13. The hydraulic motor 88 and the power generator 91 may be coupled directly or via a reduction gear.

The generator 6 provided in the engine 73 is connected to a battery charger 33, and a power generated by the generator 6 is charged to the battery 13 via the battery charger 33. The battery charger 33 is also connected to a power supply 34 of a separate system, such as a household power supply.

The main pump 71 is connected to the hydraulic motor 88 via a converging flow passage 9 and a connecting flow passage 8 that bifurcate from the main flow passage 75. The converging flow passage 9 is provided with a flow control valve 82 that controls a supply flow of working oil supplied to the hydraulic motor 88 from the main pump 71.

The flow control valve 82 is a pilot operated valve that can be switched between a blocking position and a communicating position, a spring 10 being provided on one side thereof and a pilot chamber 11 to which a pilot pressure is led being provided on the other side. Under normal conditions, the flow control valve 82 is held in the blocking position (a position shown in FIG. 1), i.e. a normal position, by a biasing force of the spring 10 such that communication between the main pump 71 and the hydraulic motor 88 is blocked. When the pilot pressure acts on the pilot chamber 11, on the other hand, the flow control valve 82 is switched to the communicating position such that the main pump 71 communicates with the hydraulic motor 88. An opening of the flow control valve 82 is controlled by the action of the pilot pressure led to the pilot chamber 11.

A solenoid pilot control valve 83 controls the pilot pressure acting on the pilot chamber 11 of the flow control valve 82. The solenoid pilot control valve 83 is a solenoid valve that can be switched between a blocking position and a communicating position, a spring being provided on one side thereof and a solenoid connected to the controller 90 being provided on the other side. When the solenoid is in a non-excited condition, the solenoid pilot control valve 83 is held in the blocking position (a position shown in FIG. 1), i.e. a normal position, by a biasing force of the spring such that the pilot chamber 11 of the flow control valve 82 communicates with a tank 85. When the solenoid is in an excited condition, on the other hand, the solenoid pilot control valve 83 is switched to the communicating position such that a pilot oil discharged from a pilot pump 84 is led to the pilot chamber 11. An opening of the solenoid pilot control valve 83 is controlled in accordance with a current applied to the solenoid, whereby the pilot pressure acting on the pilot chamber 11 of the flow control valve 82 is controlled. Hence, by having the controller 90 control the current applied to the solenoid of the solenoid pilot control valve 83, the opening of the flow control valve 82 can be controlled.

A check valve 12 that permits a flow only from the main pump 71 to the hydraulic motor 88 is provided in the converging flow passage 9 downstream of the flow control valve 82. A pressure generated between the check valve 12 and the flow control valve 82, or in other words the load pressure of the hydraulic motor 88, is led to the high pressure selection valve 66 through the second pressure leading passage 3*b*. In a condition where none of the actuators in the load sensing circuit 40 are operative and only the hydraulic motor 88 is driven, the high pressure selection valve 66 selects the load pressure of the hydraulic motor 88, and as a result, the regulator 1 controls the tilt angle of the main pump 71 such that the differential pressure between the discharge pressure of the main pump 71 and the load pressure of the hydraulic motor 88 remains constant.

Each operation valve 41 to 46 is provided with a sensor 86 serving as an operating condition detector that detects an operating condition of the operation valves 41 to 46 by electrically detecting a neutral position of the operation valves 41 to 46. Detection signals from the sensors 86 are output to the controller 90. On the basis of the detection signals from the sensors 86, the controller 90 determines whether or not the operation valves 41 to 46 are in the neutral position, or in other words whether the respective actuators are operative or inoperative. The operating condition detector is not limited to the sensor 86 for detecting the neutral position of the operation valves 41 to 46 electrically, and a sensor that detects the neutral position of the operation valves 41 to 46 hydraulically may be used instead.

Figure 2:
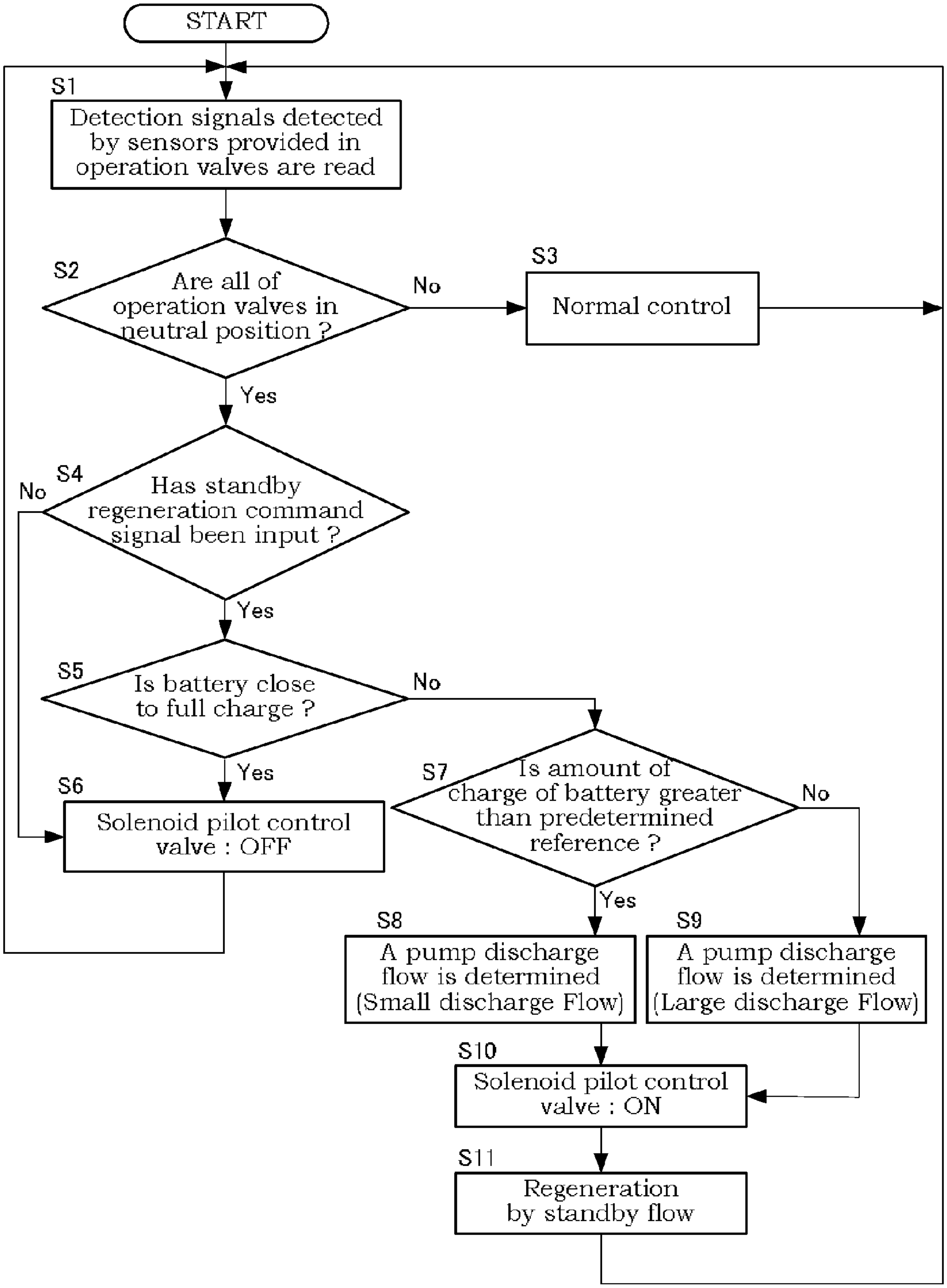
FIG. 2 is a flowchart showing a control procedure executed by a controller.

Next, referring to FIG. 2, a control procedure executed in a case where the power generator 91 generates power using the hydraulic motor 88 will be described. The following control procedure is executed by the controller 90. A CPU for controlling an overall processing operation of the control device, a program required in the processing operation of the CPU, a ROM storing data and the like, a RAM that stores data read from the ROM, data read by various measuring instruments, and so on temporarily, and so on are stored in the controller 90.

In a step 1, the sensors 86 detect the respective operating conditions of the actuators connected to the operation valves 41 to 46. More specifically, detection signals detected by the sensors 86 provided on the operation valves 41 to 46 are read.

In a step 2, a determination is made as to whether or not all of the operation valves 41 to 46 are in the neutral position on the basis of the detection signals from the sensors 86. When it is determined in the step 2 that any one of the operation valves 41 to 46 is in a switched position rather than the neutral position, the actuator connected to that operation valve is determined to be operative, and therefore the routine advances to a step 3, in which normal load sensing control is continued. The routine then returns to the step 1.

When it is determined in the step 2 that all of the operation valves 41 to 46 are in the neutral position, the respective actuators are determined to be in inoperative, whereupon the routine advances to a step 4.

To charge the battery 13 by rotating the hydraulic motor 88, a power generation request must be issued by an operator. The operator issues the power generation request by operating a power generation request switch, and when the switch is operated, a standby regeneration command signal is input into the controller 90. Hence, in the step 4, a determination is made as to whether or not the standby regeneration command signal has been input.

When it is determined in the step 4 that the standby regeneration command signal has not been input, the routine advances to a step 6. In the step 6, the solenoid of the solenoid pilot control valve 83 is maintained in a non-excited condition such that the solenoid pilot control valve 83 is held in the normal position shown in FIG. 1. When the solenoid pilot control valve 83 is held in the blocking position, i.e. the normal position, the pilot chamber 11 of the flow control valve 82 communicates with the tank 85, and therefore the flow control valve 82 is also held in the blocking position, i.e. the normal position shown in FIG. 1, such that communication between the main pump 71 and the hydraulic motor 88 is blocked. Hence, when a power generation request is not issued by the operator, the hydraulic motor 88 is not rotated and the power generator 91 is not driven.

When it is determined in the step 4 that the standby regeneration command signal has been input, the routine advances to a step 5. In the step 5, a determination is made as to whether or not the battery 13 is close to full charge. When it is determined in the step 5 that the amount of charge of the battery 13 is close to full charge, the routine advances to the step 6 again such that communication between the main pump 71 and the hydraulic motor 88 is blocked and the power generator 91 is not driven.

When it is determined in the step 5 that the amount of charge of the battery 13 is not close to full charge, or in other words that the amount of charge is insufficient, the routine advances to a step 7. In the step 7, the amount of charge of the battery 13 is determined. More specifically, a determination is made as to whether or not the amount of charge of the battery 13 is equal to or greater than a predetermined reference amount of charge. The reference amount of charge is stored in advance in the ROM of the controller 90.

When it is determined in the step 7 that the amount of charge of the battery 13 is equal to or greater than the reference amount of charge, the routine advances to a step 8. In the step 8, a required amount of charge is calculated on the basis of the current amount of charge of the battery 13, and a pump discharge flow of the main pump 71 corresponding to the required amount of charge is determined. When it is determined in the step 7 that the amount of charge of the battery 13 is smaller than the reference amount of charge, on the other hand, the routine advances to a step 9. In the step 9, similarly to the step 8, the required amount of charge is calculated on the basis of the current amount of charge of the battery 13, and the pump discharge flow of the main pump 71 corresponding to the required amount of charge is determined. Here, the pump discharge flow determined in the step 8 is smaller than the pump discharge flow determined in the step 9.

After determining the pump discharge flow in the steps 8 and 9, the routine advances to a step 10. In the step 10, an excitation current applied to the solenoid of the solenoid pilot control valve 83 is controlled in order to secure a flow that matches the pump discharge flow determined in the steps 8 and 9. Accordingly, a pilot pressure controlled by the solenoid pilot control valve 83 acts on the pilot chamber 11 of the flow control valve 82, and as a result, the flow control valve 82 is set at an opening corresponding to the pump discharge flow determined in the steps 8 and 9. By setting the opening of the flow control valve 82, the working oil discharged from the main pump 71 is led to the hydraulic motor 88 while the discharge pressure of the main pump 71 and the load pressure of the hydraulic motor 88 selected by the high pressure selection valve 66 act on the regulator 1. The regulator 1 then secures a flow corresponding to the set opening of the flow control valve 82 by controlling the tilt angle of the main pump 71 such that the differential pressure between the discharge pressure of the main pump 71 and the load pressure of the hydraulic motor 88 remains constant.

Hence, by controlling the excitation current applied to the solenoid of the solenoid pilot control valve 83 as described above, the discharge flow from the main pump 71 is controlled. By rotating the hydraulic motor 88 in accordance with this discharge flow, the power generator 91 is caused to generate power. The power generated by the power generator 91 is charged to the battery 13 via the inverter 92. As a result, regeneration is performed using a standby flow discharged from the main pump 71 (step 11).

Therefore, when the actuators of the load sensing circuit 40 are in an inoperative condition, power can be generated by rotating the main pump 71 actively using a driving force of the engine 73, and as a result, energy loss can be suppressed.

Next, referring to FIG. 1, a variable volume assist pump 89 that assists an output of the main pump 71 will be described. The assist pump 89 is coupled to the hydraulic motor 88 so as to rotate coaxially therewith. The assist pump 89 is a variable volume pump, a tilt angle of which is controlled by a regulator 14 connected to the controller 90. The assist pump 89 rotates using the power generator 91 functioning as an electric motor as a drive source, and thereby exhibits a pump function. A rotation speed of the power generator 91 is controlled by the controller 90 via the inverter 92. When the hydraulic motor 88 exhibits the power generation function, the tilt angle of the assist motor 89 is set at a minimum in order to suppress the load acting on the hydraulic motor 88.

A working oil discharged from the assist pump 89 converges with the converging flow passage 9 from an assist flow passage 87 and is then led to the main flow passage 75 on the discharge side of the main pump 71. A check valve 15 that allows the working oil to flow only from the assist pump 89 to the main flow passage 75 is provided in the assist flow passage 87.

Passages 16, 17 are connected to actuator ports of the operation valve 46 for the turning motor 81. Brake valves 18, 19 are connected to the passages 16, 17, respectively. When the operation valve 46 is held in the neutral position, the actuator ports are closed such that the turning motor 81 is maintained in a stopped condition.

When the operation valve 46 is switched in any one direction from a state in which the turning motor 81 is stopped, one of the passages 16 is connected to the main pump 71 and the other passage 17 communicates with a tank 93. As a result, a working oil is supplied from the passage 16 to cause the turning motor 81 to rotate, and a return oil from the turning motor 81 is returned to the tank 93 through the passage 17. When the operation valve 46 is switched in an opposite direction to the above direction, the passage 17 is connected to the main pump 71, the passage 16 communicates with the tank 93, and the turning motor 81 rotates in reverse.

When a pressure in the passage 16 or 17 reaches or exceeds a set pressure as the turning motor 81 rotates, the brake valve 18 or 19 opens, thereby exhibiting a relief valve function such that the pressure in a high-pressure side passage, from among the passages 16, 17, is held at the set pressure. Further, when the operation valve 46 is returned to the neutral position as the turning motor 81 rotates, the actuator ports of the operation valve 46 are closed. The turning motor 81 continues to rotate using inertial energy even when the actuator ports of the operation valve 46 are closed, and therefore the turning motor 81 exhibits a pump action. At this time, a closed circuit is formed by the passages 16, 17, the turning motor 81, and the brake valves 18, 19, and the inertial energy is converted into thermal energy by the brake valves 18, 19.

When the operation valve 43 is switched in one direction from the neutral position, the working oil discharged from the main pump 71 is supplied to a piston side chamber 21 of the boom cylinder 80 through a passage 20, and a return oil from a rod side chamber 22 is returned to the tank 93 through a passage 23, whereby the boom cylinder 80 expands. When the operation valve 43 is switched in an opposite direction to the above direction, the working oil discharged from the main pump 71 is supplied to the rod side chamber 22 of the boom cylinder 80 through the passage 23, and a return oil from the piston side chamber 21 is returned to the tank 93 through the passage 20, whereby the boom cylinder 80 contracts. A proportional solenoid valve 24, an opening of which is controlled by the controller 90, is provided in the passage 20 that connects the piston side chamber 21 of the boom cylinder 80 to the operation valve 43. Under normal conditions, the proportional solenoid valve 24 is held in a fully open position.

The connecting flow passage 8 connected to the hydraulic motor 88 is connected to the passages 16, 17 via an introduction flow passage 25 and check valves 26, 27. A solenoid switch valve 28 that is open-close controlled by the controller 90 is provided in the introduction flow passage 25. Further, a pressure sensor 29 that detects a pressure generated during turning of the turning motor 81 or a pressure generated when a brake is applied to the turning motor 81 is provided between the solenoid switch valve 28 and the check valves 26, 27, and a pressure signal from the pressure sensor 29 is output to the controller 90.

A safety valve 30 that leads the working oil to the connecting flow passage 8 when the pressure in the introduction flow passage 25 reaches a predetermined pressure is provided in the introduction flow passage 25 downstream of the solenoid switch valve 28. When a defect occurs in the introduction flow passage 25 system, for example in the solenoid switch valve 28 or the like, the safety valve 30 prevents the turning motor 81 from running away by maintaining the pressure in the passages 16, 17.

An introduction flow passage 31 that communicates with the connecting flow passage 8 is provided between the boom cylinder 80 and the proportional solenoid valve 24. A solenoid open/close valve 32 that is open-close controlled by the controller 90 is provided in the introduction flow passage 31. Under normal conditions, the solenoid open/close valve 32 is held in a closed position.

As described above, the hydraulic motor 88 communicates with the turning motor 81 via the introduction flow passage 25 and the connecting flow passage 8 and communicates with the boom cylinder 80 via the introduction flow passage 31 and the connecting flow passage 8, and is therefore rotated by the working oil supplied from both actuators 81, 80.

Figure 3:
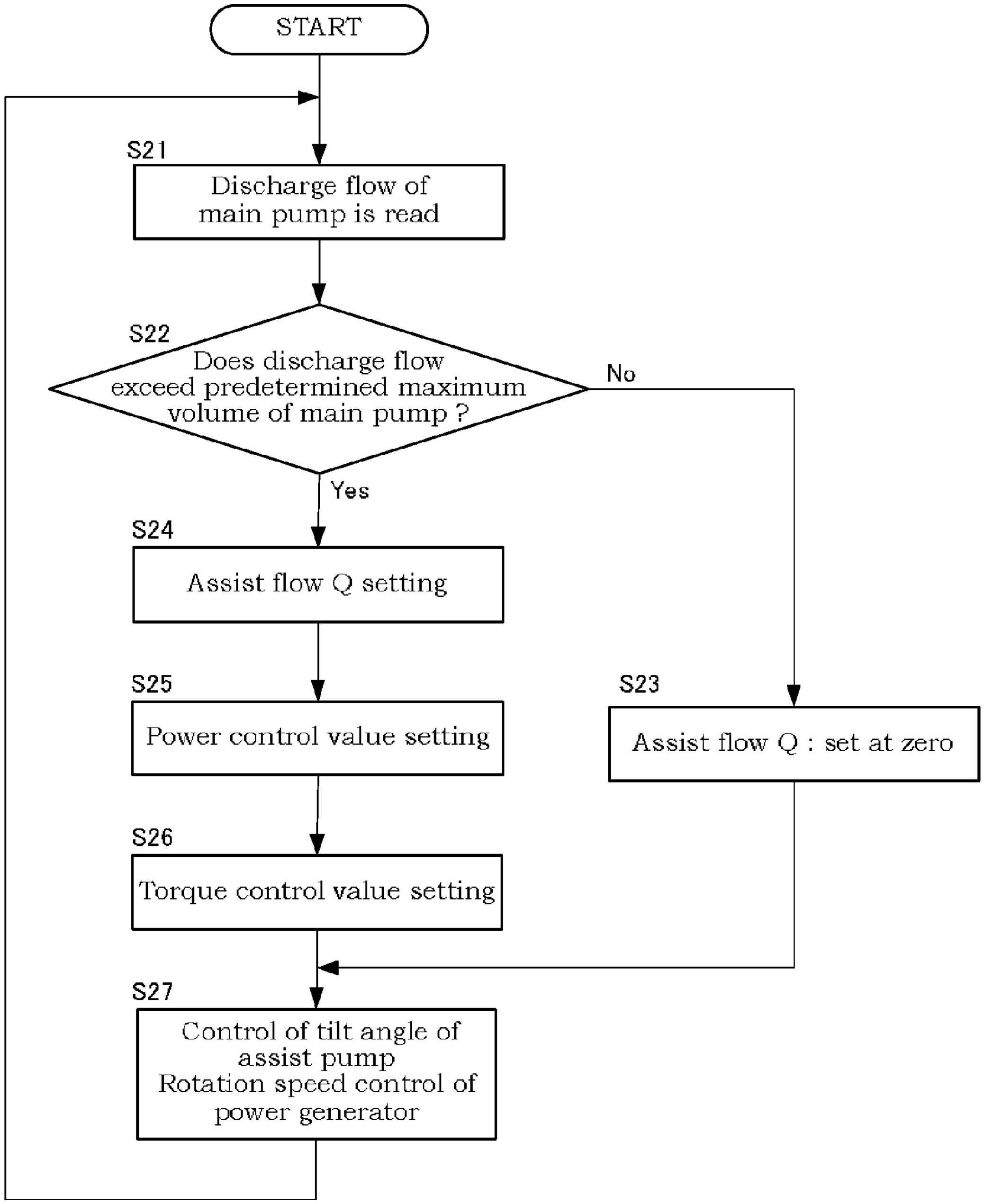
FIG. 3 is a flowchart showing a control procedure executed by the controller.

Next, referring to FIG. 3, a control procedure executed on the assist pump 89 will be described. The following control procedure is executed by the controller 90.

A maximum volume of the main pump 71, for example a rated volume, a program for calculating a discharge flow from the tilt angle of the main pump 71, and a maximum assist flow Qmax of the assist pump 89 are stored in the controller 90 in advance. The controller 90 controls an assist flow Q of the assist pump 89 within a range of the maximum assist flow Qmax. The assist flow Q of the assist pump 89 is determined by a tilt angle of the assist pump 89, a rotation speed of the power generator 91, and so on. The controller 90 determines a most efficient control method, and then controls the tilt angle of the assist pump 89 and the rotation speed of the power generator 91 functioning as a motor.

The control procedure described below is executed when the actuators are operative, or in other words when normal load sensing control is underway, and relates to the control performed in the step 3 of FIG. 2.

In a step 21, the discharge flow of the main pump 71 is calculated from the tilt angle and read.

In a step 22, a determination is made as to whether or not the discharge flow read in the step 21 exceeds a predetermined maximum volume of the main pump 71.

When it is determined in the step 22 that the discharge flow of the main pump 71 does not exceed the maximum volume, or in other words is equal to or smaller than the maximum volume, the routine advances to a step 23. In the step 23, it is determined that a surplus force for discharging a flow required by the load sensing circuit 40 exists in the main pump 71, and therefore the assist flow Q of the assist pump 89 is set at zero. The assist flow Q of the assist pump 89 may be set at zero by controlling the regulator 14 to set the tilt angle of the assist pump 89 at zero while rotating the power generator 91 or by controlling the inverter 92 to halt rotation of the power generator 91 functioning as a motor.

By halting rotation of the power generator 91, a reduction in power consumption can be achieved. In a case where rotation of the power generator 91 is continued, the assist pump 89 and the hydraulic motor 88 also continue to rotate, and therefore shock generated by activation of the assist pump 89 and the hydraulic motor 88 can be reduced. The determination as to whether to stop the power generator 91 or allow it to continue rotating may be made in accordance with the application and use conditions of the construction machine.

When it is determined in the step 22 that the discharge flow of the main pump 71 exceeds the maximum volume, the routine advances to a step 24. In the step 24, it is determined that the flow required by the load sensing circuit 40 exceeds a volume of the main pump 71, and therefore the assist flow Q of the assist pump 89 is controlled. The assist flow Q is controlled on the basis of a control map shown in FIG. 4, which is stored in the ROM of the controller 90. On the control map shown in FIG. 4, an abscissa shows a differential pressure ΔP between a discharge pressure $P_P$ of the main pump 71 and a maximum load pressure $P_L$ of the actuators, and the ordinate shows the assist flow Q of the assist pump 89. The differential pressure ΔP between the discharge pressure $P_P$ of the main pump 71 and the maximum load pressure $P_L$ of the actuators is calculated on the basis of pressure signals input from the pressure sensors 77, 78. When normal load sensing control is underway, the hydraulic motor 88 does not rotate, and therefore the maximum load pressure of the actuators exceeds the load pressure of the hydraulic motor 88. Accordingly, the high pressure selection valve 66 selects the maximum load pressure of the actuators. Hence, the pressure detected by the pressure sensor 78 is the maximum load pressure of the actuators.

Figure 4:
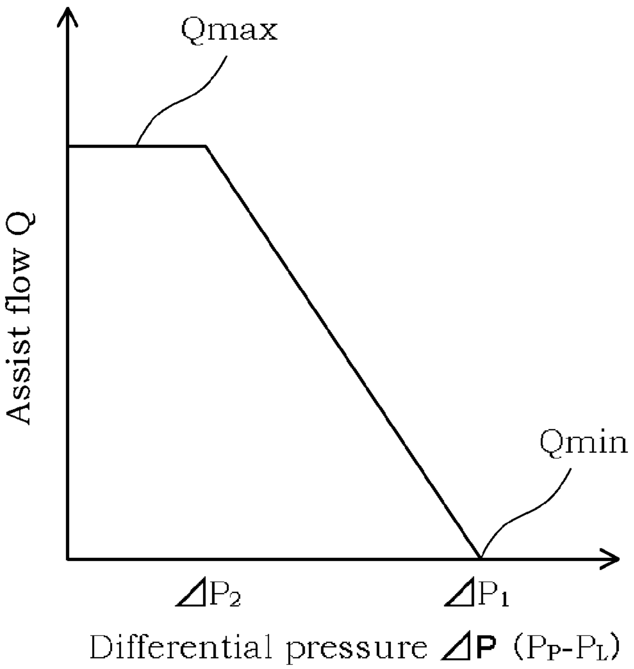
FIG. 4 is a control map showing a relationship between a differential pressure and an assist flow.

As shown in FIG. 4, when the differential pressure ΔP is greater than a predetermined differential pressure $\Delta P_1$, a certain degree of surplus force is determined to exist in the main pump 71, and therefore the assist flow Q of the assist pump 89 is set at zero. As the differential pressure ΔP decreases, the amount of surplus force in the main pump 71 decreases relative to the flow required by the load sensing circuit 40, and therefore the assist flow Q is gradually increased.

On the control map in FIG. 4, the maximum assist flow Qmax is set at a fixed level within a fixed range ($<\Delta P_2$) where the differential pressure ΔP is small. The reason for this is that in the fixed range where the differential pressure ΔP is small, it is necessary to secure as large an assist flow Q as possible. Alternatively, the control map may be formed such that the maximum assist flow Qmax is set when the differential pressure ΔP is zero, whereupon the assist flow Q is caused to approach Qmin linearly as the differential pressure ΔP increases.

In steps 25 and 26, a power control value is set such that an output of the power generator 91 functioning as a motor does not exceed a predetermined range, and a torque control value is set such that a torque of the power generator 91 does not exceed a predetermined torque. In a step 27, the tilt angle of the assist pump 89 and the rotation speed of the power generator 91 are controlled on the basis of the assist flow Q, the power control value, and the torque control value.

As described above, when the discharge flow of the main pump 71 reaches the maximum volume, the controller 90 determines that no surplus force exists in the main pump 71 and therefore begins assistance using the assist pump 89. The controller 90 then controls the assist flow Q of the assist pump 89 by controlling at least one of the rotation speed of the power generator 91 and the regulator 14 for controlling the tilt angle of the assist pump 89 on the basis of the differential pressure ΔP between the discharge pressure $P_P$ of the main pump 71 and the maximum load pressure $P_L$ of the actuators. By controlling the assist flow Q on the basis of the differential pressure ΔP between the discharge pressure $P_P$ of the main pump 71 and the maximum load pressure $P_L$ of the actuators in this manner, the assist flow Q of the assist pump 89 can be prevented from increasing excessively, and as a result, energy conservation can be achieved.

A case in which the assist flow Q of the assist pump 89 is controlled only on the basis of the differential pressure ΔP between the discharge pressure $P_P$ of the main pump 71 and the maximum load pressure $P_L$ of the actuators was described above. Alternatively, however, the assist flow Q may be controlled on the basis of two mode types, namely an engine high rotation mode and an engine low rotation mode, in accordance with the engine rotation speed detected by the rotation speed sensor 74, as shown by a control map in FIG. 5. In this case, control is performed to realize a relative increase in the assist flow Q in the engine high rotation mode, i.e. when the engine rotation speed is equal to or higher than a predetermined reference rotation speed, and to realize a relative reduction in the assist flow Q in the engine low rotation mode, i.e. when the engine rotation speed is lower than the reference rotation speed. Thus, the assist flow Q can be controlled on the basis of the differential pressure ΔP and the engine rotation speed.

The reason for controlling the assist flow Q on the basis of the engine rotation speed in this manner is as follows. In a power shovel or the like, for example, the rotation speed of the engine 73 is set by the operator. When the operator sets the engine rotation speed at a high rotation speed, a large discharge flow is required of the main pump 71. In this case, the controller 90 selects the engine high rotation mode to realize a relative increase in the assist flow Q of the assist pump 89.

Figure 5:
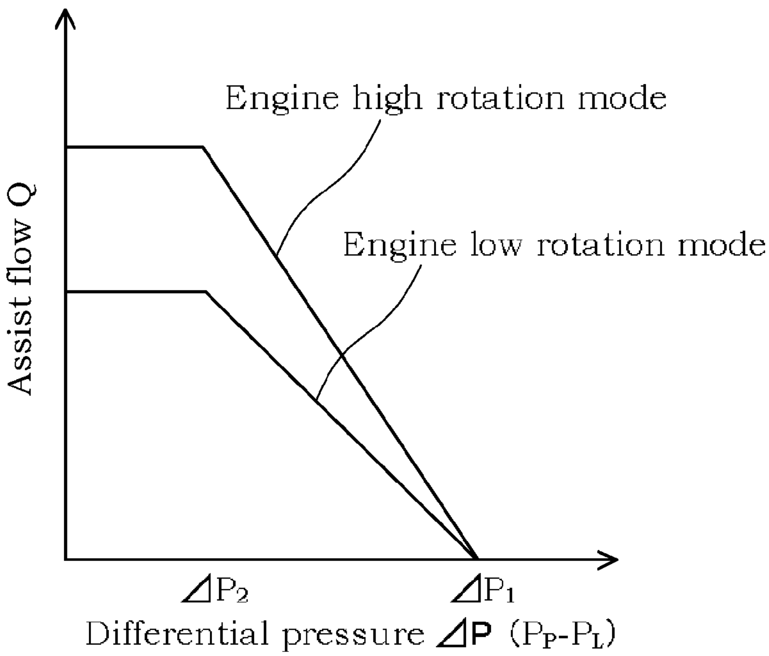
FIG. 5 is a control map showing the relationship between the differential pressure and the assist flow.

When the operator sets the engine rotation speed at a low rotation speed, on the other hand, this often means that the operator wishes to perform delicate control for moving the power shovel or the like minutely. If the assist flow Q is increased during this delicate control, a large flow flows into the actuators in response to a slight operation of the operation valves. As a result, the delicate control becomes more difficult in reality. For this reason, the controller 90 controls the assist flow Q by selecting the engine high rotation mode or the engine low rotation mode in accordance with the engine rotation speed, as shown in FIG. 5. When the engine low rotation mode is selected, delicate control can be performed on the power shovel or the like.

Next, referring to FIG. 1, a case in which the hydraulic motor 88 is rotated using a working oil from the turning motor 81 or the boom cylinder 80 will be described. When the operation valve 46 is switched to the neutral position as the turning motor 81 turns, a closed circuit is formed between the passages 16, 17 and the brake valve 18 or 19 converts inertial energy into thermal energy by maintaining a brake pressure in the closed circuit.

The pressure sensor 29 detects a turning pressure or a brake pressure of the turning motor 81 and outputs a corresponding pressure signal to the controller 90. When a pressure within a range that does not affect a turning or braking operation of the turning motor 81 and slightly lower than a set pressure of the brake valves 18, 19 is detected, the controller 90 switches the solenoid switch valve 28 from a closed position to an open position. When the solenoid switch valve 28 is switched to the open position, the working oil from the turning motor 81 is supplied to the hydraulic motor 88 through the introduction flow passage 25 and the connecting flow passage 8.

At this time, the controller 90 controls the tilt angle of the hydraulic motor 88 on the basis of the pressure signal from the pressure sensor 29. This control will be described below. When the pressure in the passages 16, 17 is not maintained at a pressure required for the turning operation or the braking operation of the turning motor 81, it becomes impossible to cause the turning motor 81 to turn or to apply a brake thereto. To maintain the pressure in the passages 16, 17 at the turning pressure or the brake pressure, the controller 90 controls a load of the turning motor 81 by controlling the tilt angle of the hydraulic motor 88. In other words, the controller 90 controls the tilt angle of the hydraulic motor 88 such that the pressure detected by the pressure sensor 29 is substantially equal to the turning pressure or the braking pressure of the turning motor 81.

When the working oil is supplied to the hydraulic motor 88 through the introduction flow passage 25 and the connecting flow passage 8 such that a rotary force is obtained from the hydraulic motor 88, the rotary force acts on the power generator 91 functioning as an electric motor, which rotates coaxially with the hydraulic motor 88. The rotary force of the hydraulic motor 88 acts on the power generator 91 as an assist force, and therefore the power consumed by the power generator 91 can be reduced by an amount corresponding to the rotary force of the hydraulic motor 88. Further, a rotary force of the assist pump 89 can be assisted by the rotary force of the hydraulic motor 88, and in this case, the hydraulic motor 88 and the assist pump 89 cooperate to exhibit a pressure conversion function.

The pressure of the working oil that flows into the connecting flow passage 8 is often lower than the pump discharge pressure of the main pump 71. To maintain a high discharge pressure in the assist pump 89 using this low pressure, the hydraulic motor 88 and assist pump 89 are caused to exhibit a boosting function. More specifically, the output of the hydraulic motor 88 is determined by a product of a displacement amount Q1 per revolution and a pressure P1 at that time. Further, the output of the assist pump 89 is determined by a product of a displacement amount Q2 per revolution and a discharge pressure P2 at that time. Since the hydraulic motor 88 and the assist pump 89 rotate coaxially, $Q1 \times P1 = Q2 \times P2$ is established. Hence, by setting the displacement amount Q1 of the hydraulic motor 88 at three times the displacement amount Q2 of the assist pump 89, or in other words by establishing $Q1=3Q2$, the above equation becomes $3Q2 \times P1 = Q2 \times P2$. By dividing both sides of the equation by Q2, $3P1=P2$ is established. Therefore, by varying the tilt angle of the assist pump 89 in order to control the displacement amount Q2, a predetermined discharge pressure can be maintained in the assist pump 89 in accordance with the output of the hydraulic motor 88. In other words, an oil pressure from the turning motor 81 can be boosted and discharged from the assist pump 89.

However, the tilt angle of the hydraulic motor 88 is controlled such that the pressure in the passages 16, 17 is held at the turning pressure or the brake pressure, as described above, and therefore, when the oil pressure from the turning motor 81 is used, the tilt angle of the hydraulic motor 88 is determined naturally. Hence, in order to generate a pressure conversion function when the tilt angle of the hydraulic motor 88 is determined, the tilt angle of the assist pump 89 is controlled. It should be noted that when the pressure in the connecting flow passage 8 system falls below the turning pressure or the brake pressure for some reason, the controller 90 closes the solenoid switch valve 28 on the basis of the pressure signal from the pressure sensor 29 to ensure that the turning motor 81 is not affected. Further, when a pressure oil leakage occurs in the connecting flow passage 8, the safety valve 30 functions to ensure that the pressure in the passages 16, 17 does not fall excessively, thereby preventing the turning motor 81 from running away.

Next, control of the boom cylinder 80 will be described. When the operation valve 43 is switched in order to operate the boom cylinder 80, an operation direction and an operation amount of the operation valve 43 are detected by a sensor (not shown) provided on the operation valve 43 and a corresponding operation signal is output to the controller 90.

In response to the operation signal from the sensor, the controller 90 determines whether the operator wishes to raise or lower the boom cylinder 80. After determining that the boom cylinder 80 is to be raised, the controller 90 holds the proportional solenoid valve 24 in a fully open position corresponding to a normal condition.

After determining that the boom cylinder 80 is to be lowered, on the other hand, the controller 90 calculates a lowering speed of the boom cylinder 80 requested by the operator in accordance with the operation amount of the operation valve 43. Further, the controller 90 closes the proportional solenoid valve 24 and switches the solenoid open/close valve 32 to the open position. As a result, an entire amount of a return oil from the boom cylinder 80 is supplied to the hydraulic motor 88. When the flow consumed by the hydraulic motor 88 is smaller than a flow required to maintain the lowering speed requested by the operator, however, the boom cylinder 80 cannot maintain the lowering speed requested by the operator. In this case, the controller 90 controls the opening of the proportional solenoid valve 24 on the basis of the operation amount of the operation valve 43, the tilt angle of the hydraulic motor 88, the rotation speed of the power generation 91, and so on such that a flow equal to or greater than the flow consumed by the hydraulic motor 88 is returned to the tank 93, and as a result, the lowering speed of the boom cylinder 80 is maintained at the lowering speed requested by the operator.

When a pressure oil is supplied to the hydraulic motor 88, the hydraulic motor 88 rotates, and the resulting rotary force acts on the coaxially rotating power generator 91. The rotary force of the hydraulic motor 88 acts on the power generator 91 as an assist force, and therefore the power consumed by the power generator 91 can be reduced by an amount corresponding to the rotary force of the hydraulic motor 88. Further, the assist pump 89 can be rotated by the rotary force of the hydraulic motor 88 alone, i.e. without supplying power to the power generator 91, and in this case, the hydraulic motor 88 and the assist pump exhibit a pressure conversion function.

Next, a case in which the turning operation of the turning motor 81 and the lowering operation of the boom cylinder 80 are performed at the same time will be described. When the boom cylinder 80 is lowered while the turning motor 81 rotates, the pressure oil from the turning motor 81 and the return oil from the boom cylinder 80 are supplied to the hydraulic motor 88 after converging in the connecting flow passage 8. At this time, the pressure in the introduction flow passage 25 increases as the pressure in the connecting flow passage 8 increases. Due to the presence of the check valves 26, 27, the turning motor 81 is not affected even when the pressure in the introduction flow passage 25 increases beyond the turning pressure or the brake pressure of the turning motor 81. Furthermore, when the pressure in the introduction flow passage 25 falls below the turning pressure or the brake pressure, the controller 90 closes the solenoid switch valve 28 on the basis of the pressure signal from the pressure sensor 29.

Hence, when the turning operation of the turning motor 81 and the lowering operation of the boom cylinder 80 are performed at the same time, the tilt angle of the hydraulic motor 88 may be determined using the required lowering speed of the boom cylinder 80 as a reference, regardless of the turning pressure or brake pressure of the turning motor 81.

The check valve 15 is provided in the assist flow passage 87, and therefore, when a defect occurs in the system of the assist pump 89 and the hydraulic motor 88, for example, the system of the main pump 71 can be disconnected from the system of the assist pump 89 and the hydraulic motor 88. Further, under normal conditions, the solenoid switch valve 28 and the solenoid open/close valve 32 are maintained in the closed position shown in FIG. 1 by a spring force of a spring and the proportional solenoid valve 24 is maintained in the fully open position. Therefore, even if a defect occurs in an electric system, the system of the main pump 71 can be disconnected from the system of the assist pump 89 and the hydraulic motor 88.

This invention is not limited to the embodiment described above and may be subjected to various amendments and modifications within the scope of the technical spirit thereof, such amendments and modifications naturally being included within the technical scope of this invention.

With respect to the above description, the contents of application No. 2009-164280, with a filing date of Jul. 10, 2009 in Japan, are incorporated herein by reference.

INDUSTRIAL APPLICABILITY

This invention may be used as a control device for a construction machine such as a power shovel.

The invention claimed is:

1. A control device for a hybrid construction machine, comprising:

a variable volume pump rotated by a driving force from a prime mover;

a regulator that controls a tilt angle of the variable volume pump;

a plurality of operation valves that control a flow of a working oil led to respective actuators from the variable volume pump;

an operating condition detector that detects an operating condition of the operation valves;

a regenerative hydraulic motor rotated by a discharge oil from the variable volume pump;

a power generator connected to the hydraulic motor;

a flow control valve provided in a flow passage connecting the variable volume pump to the hydraulic motor, an opening of which is controlled by an action of a pilot pressure led to a pilot chamber thereof;

a solenoid pilot control valve for controlling the pilot pressure that acts on the pilot chamber of the flow control valve;

a discharge pressure introduction passage that leads a discharge pressure of the variable volume pump to the regulator;

a load pressure introduction passage that leads one of a maximum load pressure of the respective actuators and a load pressure of the hydraulic motor to the regulator; and a controller which, having determined that the actuators are in an operative condition on the basis of a detection result from the operating condition detector, controls the regulator such that a differential pressure between the discharge pressure of the variable volume pump and the maximum load pressure of the respective actuators is kept constant, and having determined that the actuators are in an inoperative condition, excites a solenoid of the solenoid pilot control valve such that the discharge oil from the variable volume pump is led to the hydraulic motor and controls the regulator such that a differential pressure between the discharge pressure of the variable volume pump and the load pressure of the hydraulic motor is kept constant.

2. The control device for a hybrid construction machine as defined in claim 1, further comprising a battery that is charged with power generated as the hydraulic motor rotates, wherein the controller, having determined that the actuators are in the inoperative condition, controls a current applied to the solenoid of the solenoid pilot control valve in accordance with an amount of charge of the battery.

3. The control device for a hybrid construction machine as defined in claim 2, wherein the controller, having determined that the actuators are in the inoperative condition, calculates a required amount of charge on the basis of the amount of the charge of the battery, determines a discharge flow of the variable volume pump corresponding to the calculated required amount of charge, and controls the current applied to the solenoid of the solenoid pilot control valve such that the discharge flow of the variable volume pump reaches the determined discharge flow.

4. The control device for a hybrid construction machine as defined in claim 1, further comprising an assist pump that is coupled to the hydraulic motor so as to rotate coaxially therewith and supplies a discharge oil to a discharge side of the variable volume pump, wherein the controller, having determined that the actuators are in the operative condition, calculates a discharge flow of the variable volume pump from the tilt angle thereof, and after determining that the calculated discharge flow of the variable volume pump has reached a predetermined maximum discharge flow, controls a discharge flow of the assist pump on the basis of the differential pressure between the discharge pressure of the variable volume pump and the maximum load pressure of the respective actuators.

5. The control device for a hybrid construction machine as defined in claim 4, further comprising a rotation speed detector that detects a rotation speed of the prime mover, wherein the controller, having determined that the actuators are in the operative condition, calculates the discharge flow of the variable volume pump from the tilt angle thereof, and after determining that the calculated discharge flow of the variable volume pump has reached the predetermined maximum discharge flow, controls the discharge flow of the assist pump on the basis of the differential pressure between the discharge pressure of the variable volume pump and the maximum load pressure of the respective actuators and the rotation speed detected by the rotation speed detector.

6. The control device for a hybrid construction machine as defined in claim 4, wherein the controller controls the discharge flow of the assist pump by controlling at least one of a regulator for controlling a tilt angle of the assist pump and a rotation speed of the power generator.

* * * * *